Aug. 10, 1965     J. RODWAY     3,199,633
CLOSED LOOP, SPOT TYPE, DISC BRAKES
Filed June 14, 1963     2 Sheets-Sheet 1
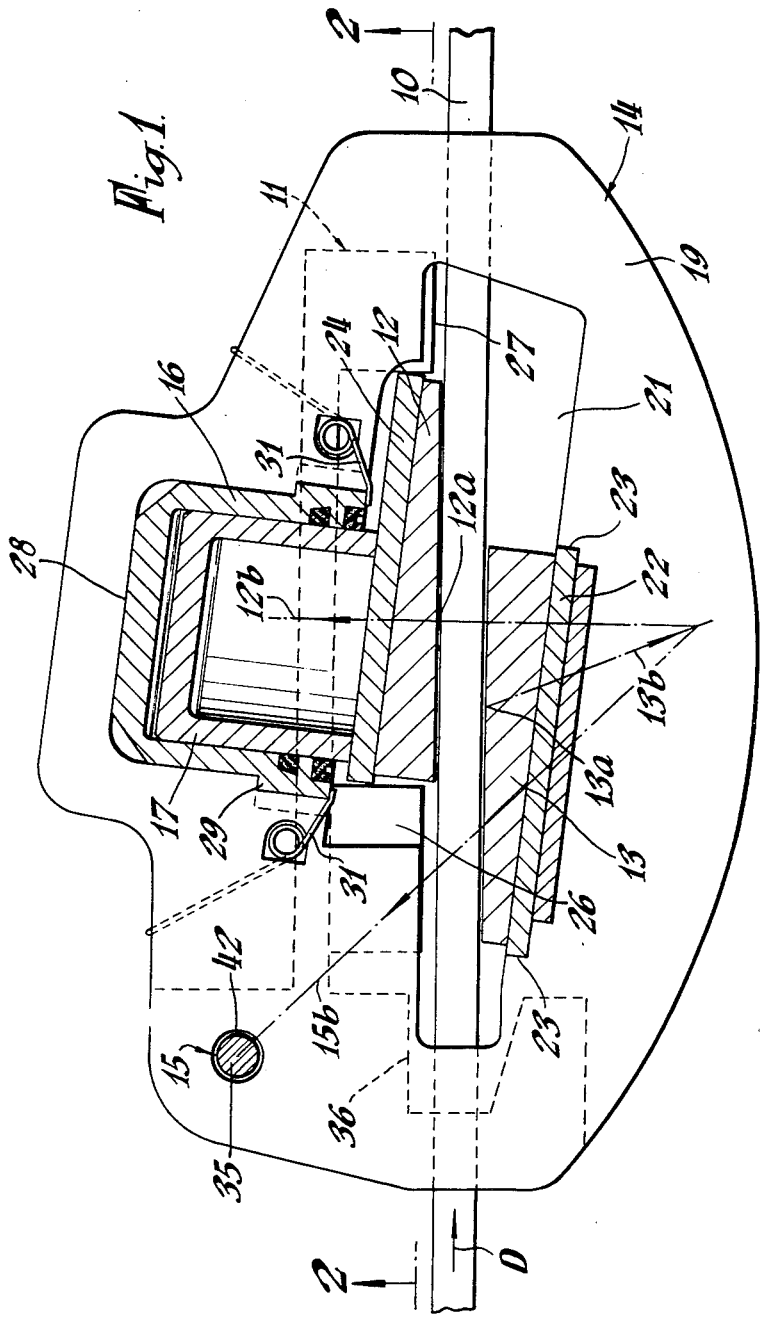
INVENTOR
John Rodway
BY
Lawrence J. Winter
ATTORNEY

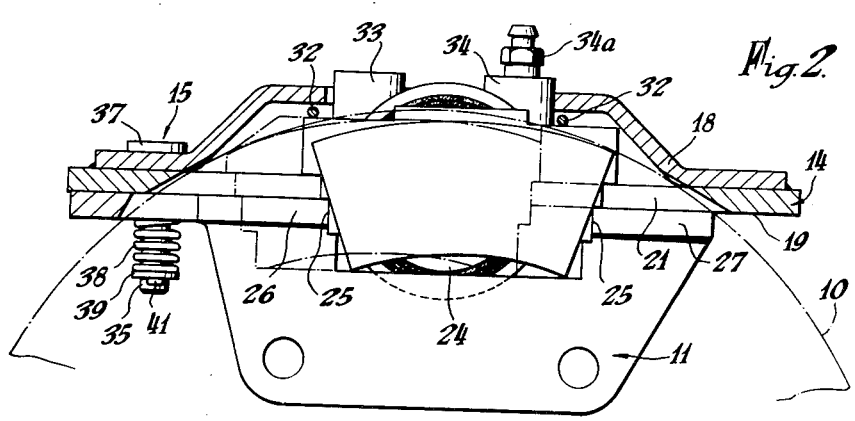
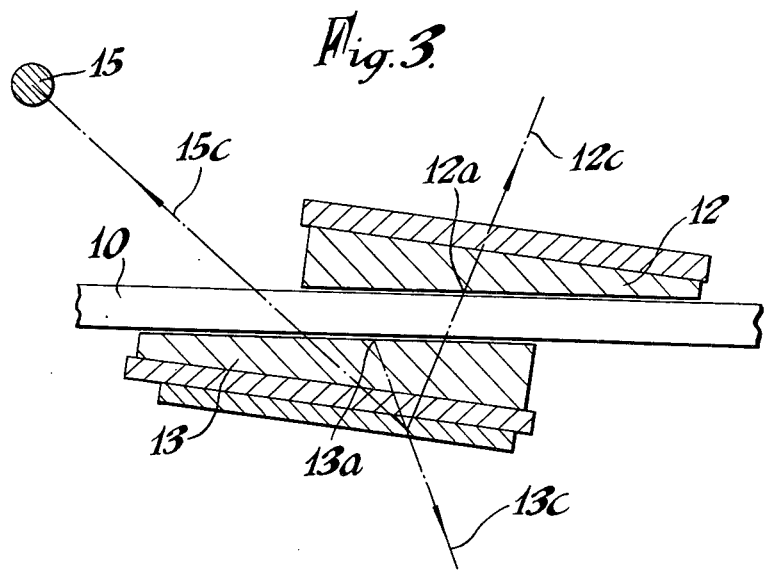

3,199,633
CLOSED LOOP, SPOT TYPE, DISC BRAKES
John Rodway, Leamington Spa, England, assignor to Automotive Products Company Limited, Warwickshire, England, a British company
Filed June 14, 1963, Ser. No. 287,898
Claims priority, application Great Britain, June 15, 1962, 23,198/62
6 Claims. (Cl. 188—73)

This invention relates to disc brakes of the type in which brake pads adapted to engage opposite sides of a rotatable brake disc are associated with a movable member in such a way that a thrust exerted to apply one pad to the disc produces a reaction force in the movable member tending to apply the other pad to the opposite side of the disc, the movable member being carried by a fixed support.

It has been proposed, in disc brakes of the type set out in the preceding paragraph, to provide the movable member with a pivotal mounting on the fixed support such that it has a swinging movement in a plane transverse to the plane of the brake disc. Such brakes are hereinafter called "disc brakes of the kind referred to."

It is the object of the present invention to provide a disc brake of the kind referred to in which some degree of self-energisation is present.

According to the present invention, in a disc brake of the kind referred to, the pivot of the movable member is offset from a plane passing through the centre of the thickness of the brake disc towards the side of the said disc on which the pad applied directly by the applying thrust acts and at least one of the pads engages the movable member in such a manner that drag forces applied to that pad by rotation of the disc exert on the movable member a force having a moment about the pivot of the movable member to the fixed support, whereby, with the brake disc rotating in one direction, the moment about the said pivot creates an additional force between the pad applied by the reaction force and the disc.

Both of the pads may engage the movable member in such a manner that drag forces applied to them by rotation of the disc exert a moment about the pivot of the movable member to the fixed support, whereby the drag forces on both pads contribute to the said additonal force.

Alternatively the pad applied directly by the applying thrust is supported against movement by the drag forces independently of the movable member, so that only the drag forces applied to the other pad are transmitted through the pivot of the movable member.

The pads may be so arranged that the distance, parallel to the plane of the brake disc, between the centre of pressure of the pad applied directly by the applying thrust and the pivot of the movable member is greater than the corresponding distance between the centre of pressure of the other pad and the said pivot, so that the movable member acts as a lever to increase the reaction thrust applied to said other pad.

The invention is hereinafter described with reference to the accompanying drawings, which show one form of disc brake according to the invention, and in which:

FIGURE 1 is a plan view partly in section of the brake;
FIGURE 2 is a sectional elevation of the brake on the line 2—2 of FIGURE 1; and
FIGURE 3 is a force diagram showing the differences in the forces resulting from a modification.

Referring to the drawings, the disc brake comprises a disc 10 rotating with a wheel or other member to be braked, a fixed support 11 adapted to be secured to a fixed part of a vehicle structure adjacent the said wheel, such as a flange on a stub axle on which the wheel is rotatable or an axle casing in which a live axle carrying the wheel is rotatable, brake pads 12 and 13 to engage opposite sides of the brake disc 10, and a movable member 14 pivotally mounted on the fixed support 11 at 15 for movement in a plane normal to the plane of the brake disc, the pads 12 and 13 being applied to opposite sides of the brake disc by pressure acting in a liquid pressure cylinder 16 mounted on the movable member and having in it a piston 17 acting on the pad 12.

The movable member 14 comprises two metal plates 18 and 19 welded together, the plate 18, which has been omitted in FIGURE 1, being shaped so that its central portion is spaced from the plate 19 leaving only their edges in contact. An opening 21 is formed in the said movable member through which a segmental portion of the brake disc 10 protrudes, and the pad 13 is mounted on a backing plate 22 which lies in a recess in one edge of the opening 21 so that the ends of the said backing plate engage the ends of the recess at 23 and hold the pad 13 against being carried round by the disc 10 when the brake is applied. The pad 12 is similarly provided with a backing plate 24 at the ends of which engage at 25 with the edges of table portions 26, 27 of the fixed support 11 on which the movable member 14 rests.

The liquid pressure cyclinder 16 is mounted in a lateral extension 28 of the opening 21, being located against movement normal to the plane of the plate 19 by the engagement in grooves extending across a rib 29 around its open end of the side edges of the extension of the opening, and being retained in the opening by spring retaining members 31. The piston 17 is cup-shaped as shown, its rim engaging the backing plate 24.

The ends of the backing plates 22 and 24 are stepped is is shown in the case of the backing plate 24 in FIGURE 2, so that they rest on the surface of the plate 19 and on the surfaces of the table portions 26, 27 respectively, being held against the said surfaces by any suitable means such as pins 32 extending across their upper edges as shown in FIGURE 2 and carried by suitable supports on the movable member.

The cylinder 16 a has a liquid pressure inlet connection at 33 for connection of a conduit leading to a liquid pressure source such as a master cylinder, and a second connection at 34 closed by a screw-down valve 34a which can be opened to release air from the liquid pressure system.

The pivot for the movable member 14 at 15 comprises a pin 35 mounted in a hole in a table 36 forming part of the fixed support 11, the pin 35 having a head 37 which bears on the movable member 14 and a coiled compression spring 38 surrounding the pin and taking its abutment on a washer 39 retained on the pin 35 by a split pin 41. The spring 38 thus presses the movable member 14 against the table surfaces on the fixed support 11 and provides frictional resistance to its pivotal movement. The pin 35 passes through a circular hole 42 in the movable member and is in alignment with one end edge of said elongated control opening 21.

As will be seen in FIGURE 1, the pivot 15 for the movable member 14 is offset from the centre of the thickness of the brake disc 10, and the centres of pressure of the pads 12 and 13, indicated at 12a and 13a respectively, are at different distances, parallel to the plane of the brake disc, from the pivot 15.

Assuming that the disc 10 rotates in such a direction that its surfaces travel between the pads 12, 13 in the direction of the arrow D, it will be evident that the drag force acting on the pad 13 in a direction parallel to the face of the disc, being transmitted to the movable member 14, will exert a moment about the pivot 15, whereas the drag force acting on the pad 12, which is not transmitted to the movable member 14, will exert no such moment. If the forces acting on the movable member 14 and pads 12, 13 regarded as an assembly are considered, the normal force due to the pad 12 may be represented by the line 12b, and the resultant of the normal and drag forces on the pad 13 by the line 13b. For equilibrium, the reaction force at the pivot 15 must be concurrent with the two forces just mentioned, so that the force can be represented by the line 15b passing through the meeting point of 12b and 13b. Since the force 13b is equal and opposite to the resultant of the forces 12b and 15b, the force 13b must be greater than the force 12b and self-energisation is obtained.

If the pad 12, as well as the pad 13, is arranged so that the drag force thereon is taken by the movable member 14, the drag forces on both pads produce moments about the pivot 15. The directions of the forces are then as shown in the diagram of FIGURE 3, the resultant of the drag and normal forces on the pad 12 being indicated by the line 12c, the corresponding resultant for the pad 13 by the line 13c and the reaction force at the pivot 15 by the line 15c. As in the previous case, the force 13c is equal and opposite to the resultant of the forces 12c and 15c, so that it must be greater than the force 12c and there must be self-energisation.

Thus one factor determining the degree of servo-assistance provided will be whether or not the pad 12 is supported against the drag forces by the movable member 14, the servo effect, other factors being equal, being greater if both pads are supported against the drag forces by the movable member. Another factor determining the degree of servo-assistance is the perpendicular distance of the pivot 15 from the central plane of the brake disc. Placing the pivot 15 further from the said plane increases the moment exercised by the drag force or forces and thus increases the degree of servo-assistance obtained.

In the arrangement shown in FIGURE 1, and in the diagram of FIGURE 3, the pad 12 is shown as having its centre of pressure 12a further from the pivot 15, in a direction parallel to the plane of the disc 10, than is the centre of pressure 13a of the pad 13. By reason of this arrangement, the movable member 14 acts as a lever to increase the thrust urging the pad 13 against the disc relative to the thrust exerted by the fluid pressure in the cylinder 16. This further increases the total effectiveness of the brake. However, if preferred, the pads 12 and 13 may be disposed with their centres of pressure on a common line perpendicular to the plane of the disc 10.

The pads 12 and 13, as shown in FIGURE 1, are wedge-shaped in longitudinal cross-section since, owing to the movement of the movable member 14 about the pivot 15, the greatest wear takes place at one end of each pad. As the pads wear, their backing plates 22 and 24 approach a position of parallelism with the plane of the brake disc, so that the pads are of substantially uniform thickness when worn to the maximum possible extent.

If the disc rotates in the opposite direction, the moment about the pivot 15 tends to reduce the pressure of the pad 13 on the disc 10, and to apply a load to the pad 12 opposing the pressure in the cylinder 16. Thus a negative servo action is provided, and the braking effect for disc rotation in this direction is substantially less than for disc rotation in the direction first described.

I claim:

1. A disc brake comprising a fixed support with a substantially horizontal portion, a closed loop member slidably disposed on said horizontal portion, vertical pin means pivotally connecting one end of said horizontal portion and closed loop member to each other, the opposite adjacent ends of said horizontal portion and closed loop member being movable with respect to each other, a brake disc adapted to extend into the opening defined by the closed loop member, pad members on said loop member disposed on opposite sides of said brake disc, actuating means on one side of said loop member operatively connected to said pad members to move a pad member on one side of said brake disc into contact with said brake disc to swing said loop member in a horizontal plane and move said pad member on the opposite side of said brake disc into contact with said brake disc, said pin means being laterally offset from said opening and brake disc on said one side of the closed loop member on which said actuating means is disposed, and said pad members being offset from each other in a direction extending parallel to the plane of said brake disc.

2. The brake of claim 1 wherein the pad member on said one side is farther from said pivot means than the pad member on the opposite side.

3. A disc brake comprising a fixed support with a portion for receiving a movable member thereon, a closed loop member slidably disposed on said support portion, pin means pivotally connecting one end of said portion and closed loop member to each other, the opposite adjacent ends of said fixed support portion and closed loop member being movable with respect to each other, a brake disc adapted to extend into the opening defined by the closed loop member perpendicular to the plane of said closed loop member, pad means on said closed loop member disposed on opposite sides of said brake disc, actuating means on one side of said closed loop member operatively connected to said pad means to move a pad means on one side of said disc into contact with said brake disc to swing said loop member in a plane perpendicular to said disc and move said pad means into contact with said disc, said pin means being laterally offset from said opening and brake disc, and disposed on said one side of the closed loop member on which said actuating means is disposed, said pad means consisting of at least two friction pad members having portions thereof disposed out of alignment with each other in a direction extending parallel to the plane of said brake disc.

4. A disc brake comprising a fixed support with a portion for receiving a movable member thereon, a closed loop member slidably disposed on said support portion, pin means pivotally connecting one end of said portion and closed loop member to each other, the opposite adjacent ends of said fixed support portion and closed loop member being movable with respect to each other, a brake disc adapted to extend into the opening defined by the closed loop member perpendicular to the plane of said closed loop member, pad means on said closed loop member disposed on opposite sides of said brake disc, actuating means on one side of said closed loop member operatively connected to said pad means to move a pad means on one side of said disc into contact with said brake disc to swing said loop member in a plane perpendicular to said disc and move said pad means into contact with said disc, said pin means being laterally offset from said opening and brake disc, and disposed on said one side of the closed loop member on which said actuating means is disposed, said pad means consisting of at least two pad members having portions thereof disposed out of alignment with each other in a direction extending parallel to the plane of said brake disc, and the pad member on the side of said loop member on which said actuating means is disposed being farther from said pin means than said other pad member.

5. A disc brake comprising a fixed support with a horizontal portion for receiving a movable member thereon, a closed loop member defining an elongated central opening slidably disposed on said fixed support and having a brake pad recess in each opposite longitudinal edge extending outwardly beyond the perimeter of the central opening and toward the opposite sides of the movable member, said movable member having a cylinder recess therein disposed adjacent the outer edge of one pad recess and extending a distance toward one side of said movable member, pin means pivotally connecting one end of said portion and closed loop member to each other, the opposite adjacent ends of said fixed support portion and closed loop member being movable with respect to each other, a brake disc adapted to extend into the central opening defined by the closed loop member perpendicular to the plane of said closed loop member, brake pads on said closed loop member disposed in each of said pad recesses, said pin means being disposed a substantial perpendicular distance from the plane of a brake disc adapted to extend into said opening and spaced a distance beyond the outer edge of the brake pad recess on the same side as said cylinder recess and in alignment with one end edge of said elongated central opening, and actuating means disposed in said cylinder recess and operatively connected to said pads to move a pad on one side of said movable member into contact with said brake disc to swing said loop member in a plane perpendicular to said brake disc and move the other pad into contact with the opposite side of said disc to produce a servo action.

6. The brake of claim 5 wherein the distance parallel to the plane of the brake disc of the brake pad center of pressure in the recess on the same side as the pivot pin means, is a greater distance than the center of pressure of the other brake pad from the pin means to increase the reaction thrust of the other brake pad.

References Cited by the Examiner
UNITED STATES PATENTS

| 2,663,384 | 12/53 | Chamberlain | 188—73 |
| 2,820,530 | 1/58 | Chouings et al. | 188—152 |
| 2,966,964 | 1/61 | Brueder | 188—73 |

ARTHUR L. LA POINT, *Primary Examiner.*

EUGENE G. BOTZ, *Examiner.*